(12) United States Patent
Klasen-Memmer et al.

(10) Patent No.: US 7,425,355 B2
(45) Date of Patent: Sep. 16, 2008

(54) LIQUID-CRYSTALLINE MEDIUM

(75) Inventors: Melanie Klasen-Memmer, Heuchelheim (DE); Matthias Bremer, Darmstadt (DE); Elvira Montenegro, Weinheim (DE)

(73) Assignee: Merck Patent GmbH, Darmstadt (DE)

( * ) Notice: Subject to any disclaimer, the term of this patent is extended or adjusted under 35 U.S.C. 154(b) by 9 days.

(21) Appl. No.: 11/437,863

(22) Filed: May 22, 2006

(65) Prior Publication Data

US 2006/0263544 A1 Nov. 23, 2006

(30) Foreign Application Priority Data

May 21, 2005 (DE) .................. 10 2005 023 556

(51) Int. Cl.
*C09K 19/12* (2006.01)
*C09K 19/30* (2006.01)

(52) U.S. Cl. ............... 428/1.1; 252/299.63; 252/299.66

(58) Field of Classification Search .................. 428/1.1; 252/299.66, 299.63
See application file for complete search history.

(56) References Cited

U.S. PATENT DOCUMENTS

| | | | |
|---|---|---|---|
| 5,204,019 A * | 4/1993 | Reiffenrath et al. .... 252/299.66 |
| 6,217,953 B1 | 4/2001 | Heckmeier et al. |
| 6,468,608 B1 * | 10/2002 | Bremer et al. ............... 428/1.1 |
| 6,753,046 B2 | 6/2004 | Anabe et al.. |
| 7,125,589 B1 | 10/2006 | Chang et al. |
| 7,211,302 B2 * | 5/2007 | Manabe et al. ............... 428/1.1 |
| 2002/0014613 A1 | 2/2002 | Klasen et al. |
| 2003/0197154 A1 | 10/2003 | Manabe et al. |
| 2004/0065866 A1 | 4/2004 | Kato et al. |
| 2005/0279968 A1 * | 12/2005 | Manabe et al. ......... 252/299.63 |

FOREIGN PATENT DOCUMENTS

| | | | |
|---|---|---|---|
| DE | 10247986 | * | 4/2004 |
| EP | 0 439 089 A | | 7/1991 |
| GB | 2 240 778 A | | 8/1991 |
| WO | WO 90/09420 A | | 8/1990 |
| WO | WO 2005/123878 | | 12/2005 |
| WO | WO 2005/123880 A | | 12/2005 |

OTHER PUBLICATIONS

English translation for DE 10247986, 2004.*

* cited by examiner

*Primary Examiner*—Shean C Wu
(74) *Attorney, Agent, or Firm*—Millen, White, Zelano, Branigan, P.C.

(57) ABSTRACT

A liquid-crystalline medium based on a mixture of polar compounds which comprises at least one compound of the formula I

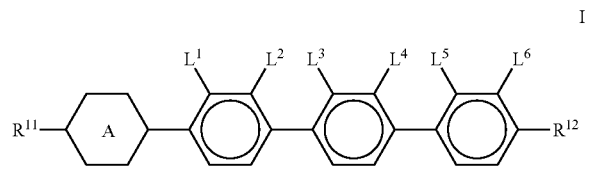

in which
$R^{11}$, $R^{12}$,

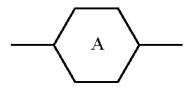

and $L^{1-6}$ have the meanings indicated in Claim 1, is described. Also described is the use thereof for an active-matrix display based on the ECB, PALC, FFS or IPS effect.

14 Claims, No Drawings

LIQUID-CRYSTALLINE MEDIUM

The invention relates to a liquid-crystalline medium based on a mixture of polar compounds which comprises at least one compound of the formula I

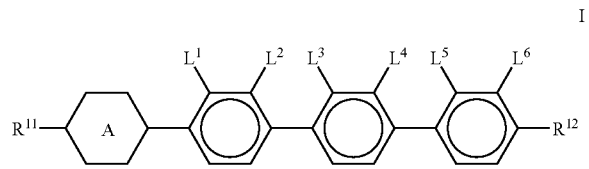

in which $R^{11}$ and $R^{12}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

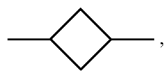

—C≡C—, —$CF_2$O—, —OC—O— or —O—CO— in such a way that O atoms are not linked directly to one another,

denotes
a) a 1,4-cyclohexenylene or 1,4-cyclohexylene radical, in which one or two non-adjacent $CH_2$ groups may be replaced by —O— or —S—,
b) a 1,4-phenylene radical, in which one or two CH groups may be replaced by N,
c) a radical from the group consisting of piperidine-1,4-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) are optionally monosubstituted or polysubstituted by halogen atoms,
$L^{1-6}$ each, independently of one another, denote H or F, with the proviso that at least two radicals $L^1$ to $L^6$ denote F.

Media of this type are to be used, in particular, for electro-optical displays with active-matrix addressing based on the ECB effect and for IPS (in plane switching) displays. The medium according to the invention preferably has negative dielectric anisotropy.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy Δn and values for the dielectric anisotropy Δ∈ of ≦−0.5 in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS effect.

Industrial application of this effect in electro-optical display elements requires LC phases which have to satisfy a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases. However, it has not been possible to prepare optimum phases easily in this manner, since no liquid-crystal materials having significantly negative dielectric anisotropy and adequate long-term stability have hitherto been available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate.
2. Thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays disclosed hitherto usually operate as TN cells with crossed polarizers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or air-craft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantage of the MLC-TN displays disclosed hitherto is due to their comparatively low contrast, the relatively high viewing-angle dependence and the difficulty of producing grey shades in these displays.

There thus continues to be a great demand for MLC displays having very high specific resistance at the same time as a wide operating-temperature range, short response times and low threshold voltage with the aid of which various grey shades can be produced.

The invention has an object of providing MLC displays, not only for monitor and TV applications, but also for mobile telephones and navigation systems, which are based on the ECB or IPS effect and do not have the disadvantages indicated above, or only do so to a lesser extent, and at the same time have very high specific resistance values. In particular, it must be ensured for mobile telephones and navigation systems that they also work at extremely high and extremely low temperatures.

Upon further study of the specification and appended claims, further objects and advantages of this invention will become apparent to those skilled in the art.

Surprisingly, it has now been found that these objects can be achieved if nematic liquid-crystal mixtures which comprise at least one compound of the formula I are used in these display elements.

The invention includes to a liquid-crystalline medium based on a mixture of polar compounds which comprises at least one compound of the formula I.

The mixtures according to the invention exhibit very broad nematic phase ranges with clearing points preferably ≦85° C., very favorable values for the capacitive threshold, relatively high values for the holding ratio and at the same time very good low-temperature stabilities preferably at −30° C. and −40° C. as well as very low rotational viscosities. The mixtures according to the invention are furthermore distinguished by a good ratio of clearing point and rotational viscosity and a high negative dielectric anisotropy.

Some preferred embodiments of the mixtures according to the invention are shown below:

a) $R^{11}$ and/or $R^{12}$ in the compounds of the formula I preferably denote H, alkyl, alkenyl or alkoxy having up to 6 C atoms; $R^{11}$ and $R^{12}$ particularly preferably denote alkyl, where the alkyl radical may be identical or different.

b) Liquid-crystalline medium in which $R^{11}$ in formula I preferably has the following meanings: straight-chain alkyl, vinyl, 1E-alkenyl or 3-alkenyl.

If $R^1$ denotes alkenyl, it is preferably $CH_2=CH$, $CH_3—CH=CH$, $C_3H_7—CH=CH$, $CH_2=CH—C_2H_5$ or $CH_3—CH=CH—C_2H_5$.

c) Liquid-crystalline medium which comprises one, two, three, four or more, preferably one or two, compounds of the formula I.

d) Liquid-crystalline medium in which the proportion of compounds of the formula I in the mixture as a whole is at least 2% by weight, preferably at least 4% by weight, particularly preferably 2-20%.

e) Liquid-crystalline medium which additionally comprises one or more compounds of the formulae IIA and/or IIB

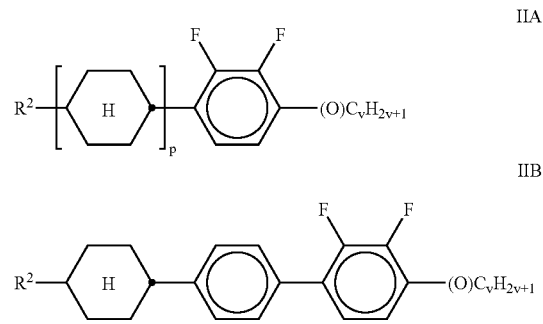

in which $R^2$ has the meaning indicated for $R^{11}$, p denotes 1 or 2, and v denotes 1 to 6.

f) Liquid-crystalline medium which additionally comprises one or more compounds of the formula III

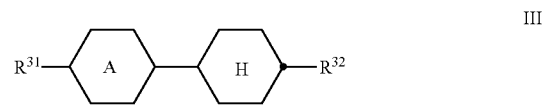

in which $R^{31}$ and $R^{32}$ each, independently of one another, denote a straight-chain alkyl, alkenyl, alkylalkoxy or alkoxy radical having up to 12 C atoms, and

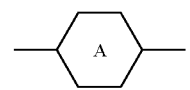

denotes

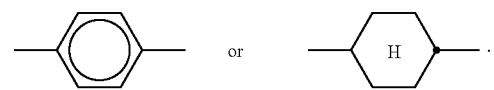

g) Liquid-crystalline medium in which the proportion of compounds of the formulae IIA and/or IIB in the mixture as a whole is at least 20% by weight.

h) Liquid-crystalline medium in which the proportion of the compounds of the formula III in the mixture as a whole is at least 5% by weight.

i) Liquid-crystalline medium which comprises at least one compound selected from the sub-formulae I1 to I19:

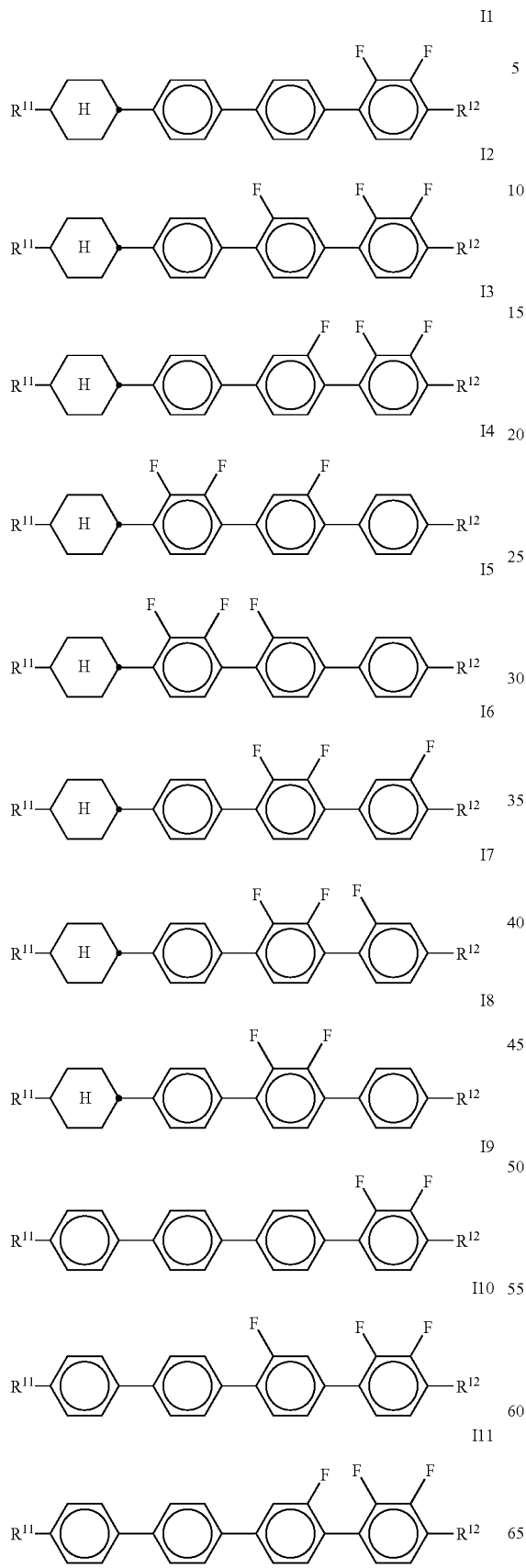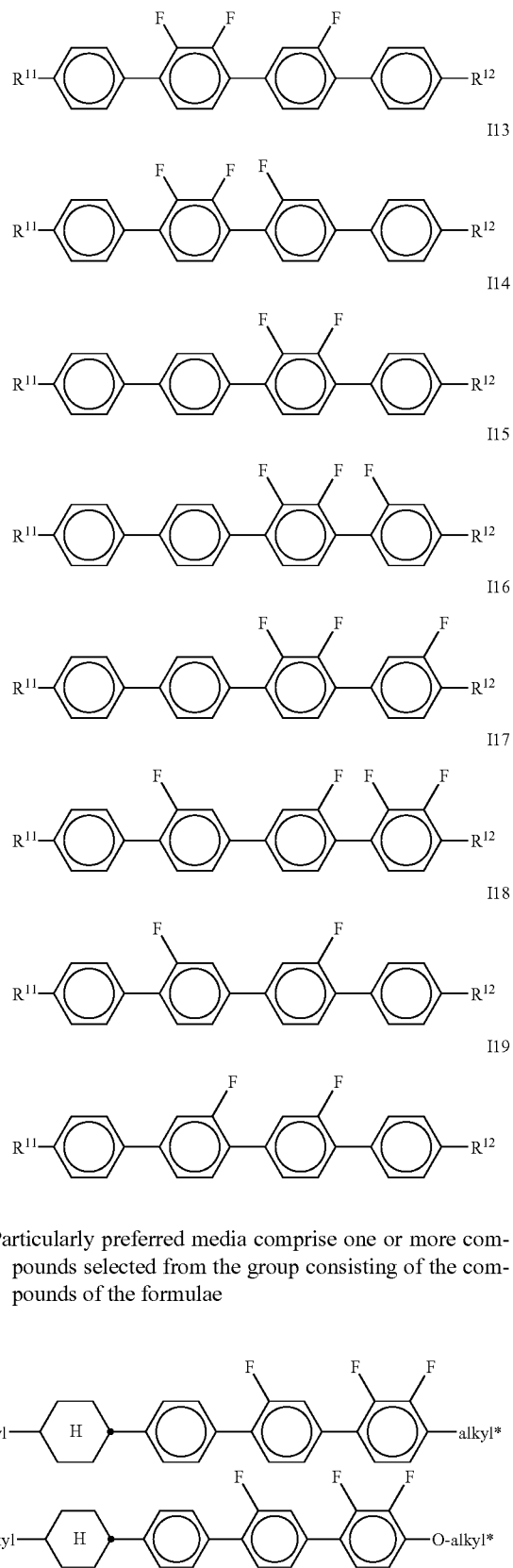
Particularly preferred media comprise one or more compounds selected from the group consisting of the compounds of the formulae

*-continued*

[Structures showing various fluorinated alkyl/alkoxy biphenyl and terphenyl compounds]

j) Liquid-crystalline medium which additionally comprises one or more compounds selected from the formulae IIIa to IIIf:

[Structure IIIa: alkyl–H–H–alkyl*]

[Structure IIIb: alkyl–H–H–O-alkyl*]

[Structure IIIc: alkyl–H–O–alkyl*]

[Structure IIId: alkyl–H–O–O-alkyl*]

[Structure IIIe: alkyl–H–H–alkenyl]

[Structure IIIf: alkenyl–H–H–alkenyl*]

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The medium according to the invention preferably comprises at least one compound of the formula IIIa, formula IIIb and/or formula IIIe.

Preferred media comprise >20% by weight, preferably >30% by weight, in particular >40% by weight, of compounds of the formula IIIe.

Particularly preferred compounds of the formulae IIIe and IIIf are shown below:

[Structures of preferred compounds with alkyl/alkenyl substituents on cyclohexane rings]

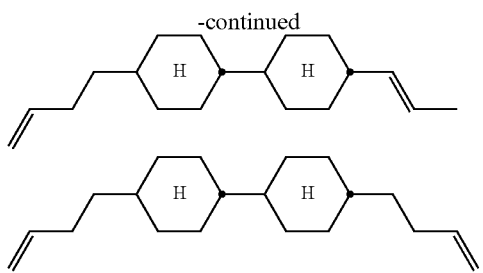

k) Liquid-crystalline medium which essentially comprises or consists of:
  2-20% by weight of one or more compounds of the formula I and
  20-80% by weight of one or more compounds of the formulae IIA and/or IIB.
l) Liquid-crystalline medium which additionally comprises one or more tetracyclic compounds of the formulae

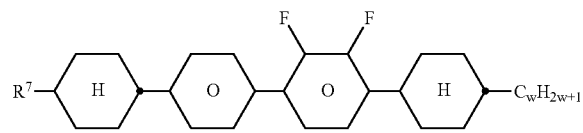
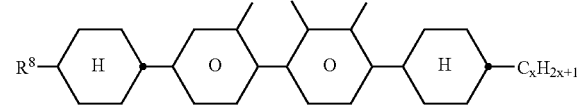
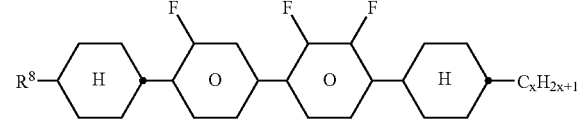
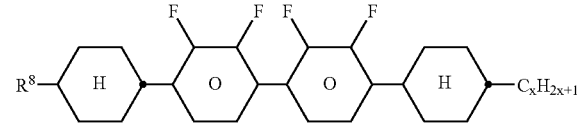

in which
  $R^7$ and $R^8$ each, independently of one another, have one of the meanings indicated for $R^{11}$ in claim 1, and
  w and x each, independently of one another, denote 1 to 6.
m) Liquid-crystalline medium which additionally comprises one or more compounds of the formulae

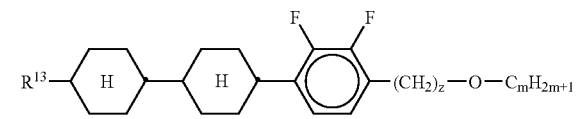
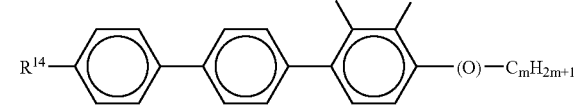
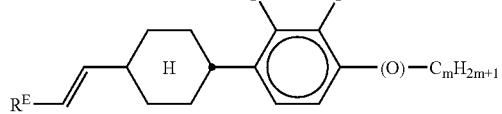
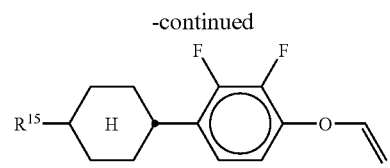
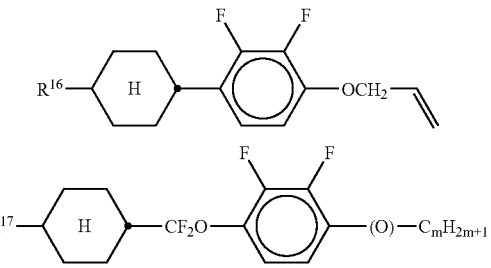
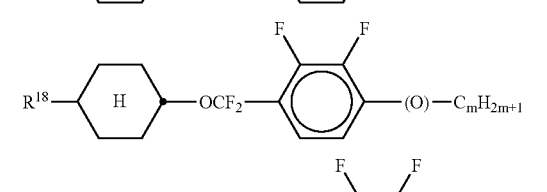
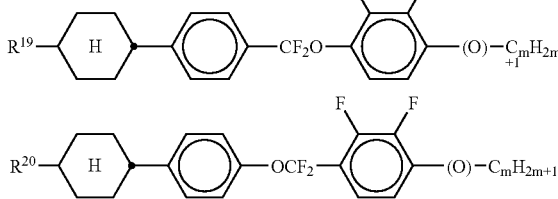
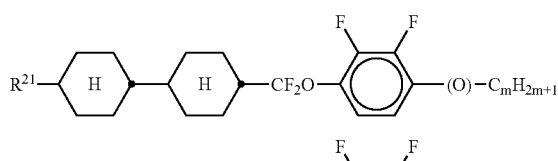
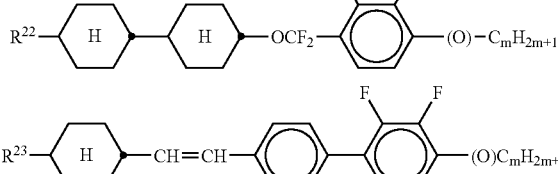
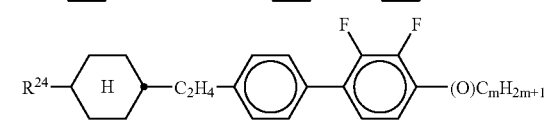

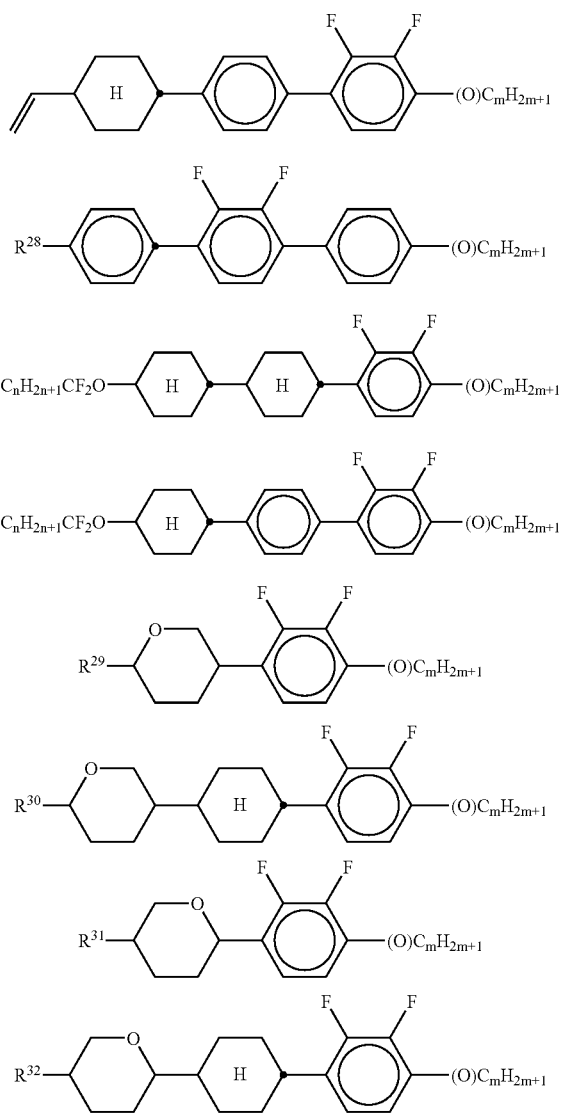

in which $R^{13}$-$R^{30}$ each, independently of one another, have the meaning indicated for $R^{11}$, and z and m each, independently of one another, denote 1-6 and n denotes 0, 1, 2 or 3. $R^E$ denotes H, $CH_3$, $C_2H_5$ or n-$C_3H_7$.

n) Liquid-crystalline medium which additionally comprises one or more compounds of the formula

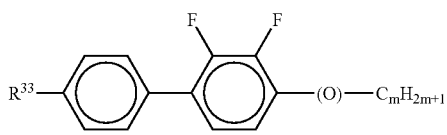

preferably in amounts of >3% by weight, in particular $\geqq$5% by weight and very particularly preferably 5-25% by weight,
where
$R^{33}$ has the meanings indicated for $R^{11}$ and m denotes 1-6.

o) Liquid-crystalline medium additionally comprising one or more compounds of the formulae

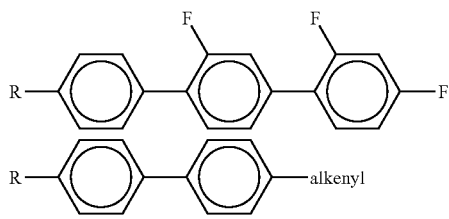

in which R denotes alkyl, alkenyl, alkoxy, alkylalkoxy or alkenyloxy having 1 or 2 to 6 C atoms, and alkenyl has the meaning indicated above.

p) Liquid-crystalline medium which additionally comprises one or more compounds of the formulae

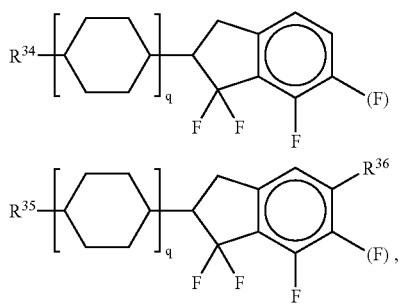

preferably in amounts of >3% by weight, in particular >5% by weight and very particularly preferably 5-25% by weight,
where
$R^{34\text{-}35}$ has the meanings indicated for $R^{11}$ and $R^{36}$ denotes $CH_3$, $C_2H_5$ or n-$C_3H_7$ and q denotes 1 or 2 q) Liquid-crystalline medium which additionally comprises one or more compounds of the formulae

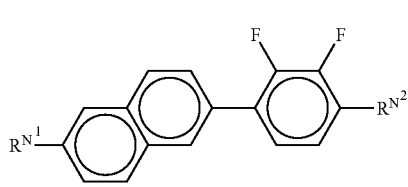

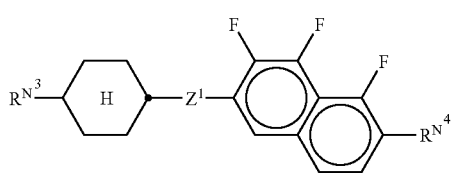

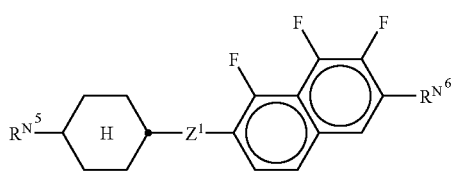

-continued

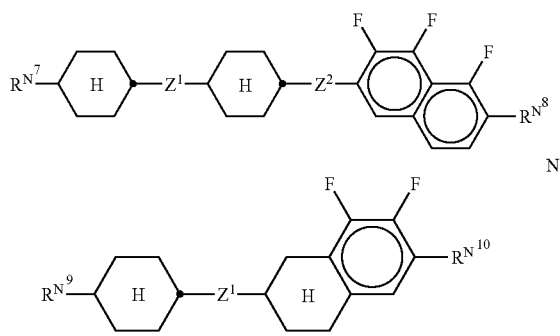

in which $R^{N1}$ to $R^{N10}$ each, independently of one another, have the meanings indicated for $R^{11}$, and the proportion of the naphthylene compounds in the mixture is 2-40% by weight, based on the mixture.

The invention furthermore relates to an electro-optical display with active-matrix addressing based on the ECB effect, characterised in that it contains, as dielectric, a liquid-crystalline medium according to one of claims 1 to 9.

The liquid-crystal mixture preferably has a nematic phase range of at least 60 K and a flow viscosity $v^{20}$ of at most 30 $mm^2 \cdot s^{-1}$ at 20° C.

The liquid-crystal mixture according to the invention has preferably a $\Delta\in$ of about −0.5 to −8.0, in particular about −3.0 to −6.0, where $\Delta\in$ denotes the dielectric anisotropy. The rotational viscosity $\gamma_1$ is preferably <200 mPa·s, in particular <170 mPa·s.

The birefringence $\Delta n$ in the liquid-crystal mixture is preferably between 0.07 and 0.16, more preferably between 0.08 and 0.12.

The mixtures according to the invention are suitable for all VA-TFT applications, such as, for example, VAN, MVA, (S)-PVA and ASV. They are furthermore suitable for IPS (in-plane switching), FFS (fringe field switching) and PALC applications of negative $\Delta\in$.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq -0.5$. It preferably comprises compounds of the formulae I, IIA and/or IIB.

The proportion of component A is preferably between 45 and 100%, in particular between 60 and 100%.

For component A, one (or more) individual compound(s) which has (have) a value of $\Delta\in$ of $\leq -0.8$ is (are) preferably selected. This value must be more negative the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

Particularly preferred individual compounds in component B are extremely low-viscosity nematic liquid crystals having a flow viscosity of not greater than 18 $mm^2 \cdot s^{-1}$ preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, compounds of the formulae I, IIA and/or IIB and optionally III.

Besides compounds of the formulae I, IIA and/or IIB and III, other constituents may also be present, for example in an amount of up to 45% of the mixture as a whole, but preferably up to 35%, in particular up to 10%;

The other constituents are preferably selected from nematic or nematogenic substances, in particular known substances, from the classes of the azoxybenzenes, benzylidene-anilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

In one embodiment, prefered compounds which are suitable as constituents of liquid-crystal phases of this type can be characterised by the formula IV

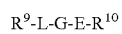

$$R^9\text{-L-G-E-}R^{10} \qquad\qquad IV$$

in which L and E each denote a carbocyclic or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH=CH— —N(O)=N—
—CH—CQ— —CH=N(O)—
—C≡C— —CH₂—CH₂—
—CO—O— —CH₂—O—
—CO—S— —CH₂—S—
—CH=N— —COO-Phe-COO—
—CF₂O— —CF=CF—
—OCF₂— —OCH₂—
—(CH₂)₄— —(CH₂)₃O— or a C—C single bond, Q denotes halogen, preferably chlorine, or —CN, and $R^9$ and $R^{10}$ each denote alkyl alkenyl, alkoxy, alkanoyloxy or alkoxy-carbonyloxy having up to 18, preferably up to 8, carbon atoms, or one of these radicals alternatively denotes CN, NC, NO₂, NCS, CF₃, OCF₃, F, Cl or Br.

In most of these compounds, $R^9$ and $R^{10}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS, FFS or PALC mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

The entire disclosure of all applications, patents and publications, cited herein and of corresponding German application No. 10 2005 023 556.5, filed May 21, 2005 is incorporated by reference herein.

The following examples are intended to explain the invention without-limiting it. Above and below, percentages are percent by weight; all temperatures are indicated in degrees Celsius.

Besides the compounds of the formula 1, the mixtures according to the invention preferably comprise one or more of the compounds shown below.

The following abbreviations are used:

(n and m=1-6; z=1-6)

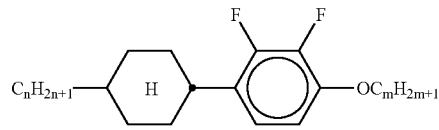

CY-n-Om

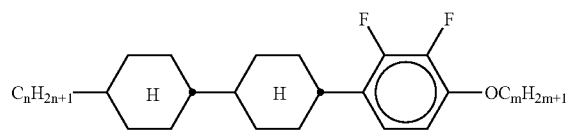

CCY-n-Om

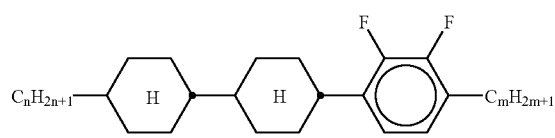

CCY-n-m

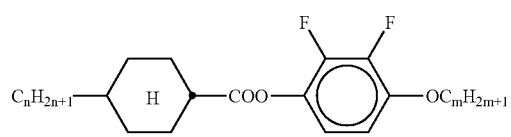

D-nOmFF

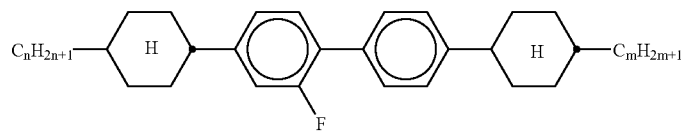

CBC-nmF

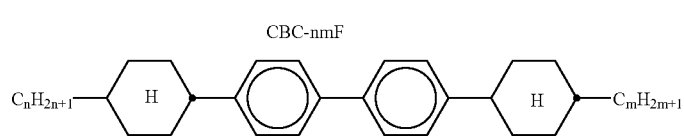

CBC-nm

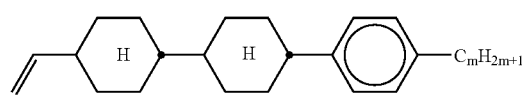

CCP-V-m

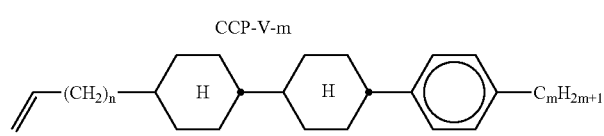

CCP-Vn-m

-continued
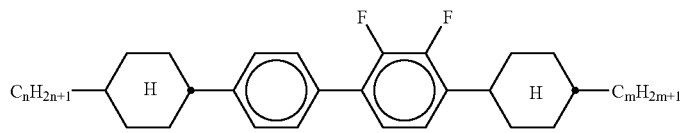
CPYC-n-m
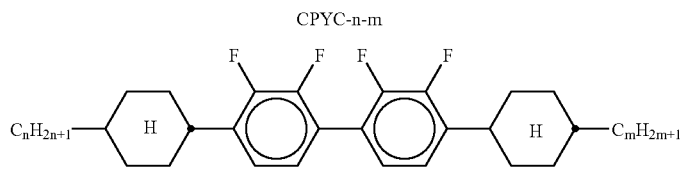
CYYC-n-m
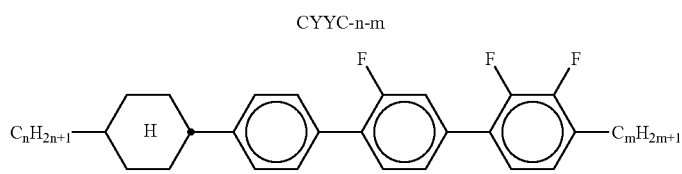
CPGIY-n-m
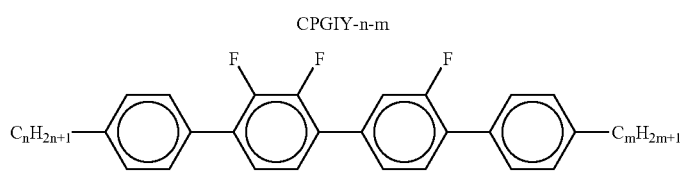
PYGP-n-m
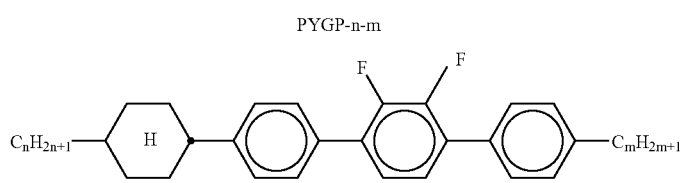
CPYP-n-m
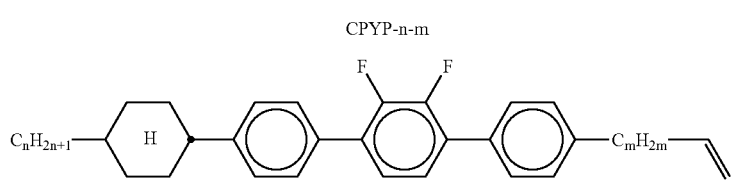
CPVP-n-mV
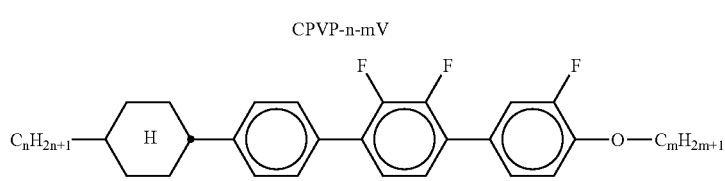
CPYG-n-Om
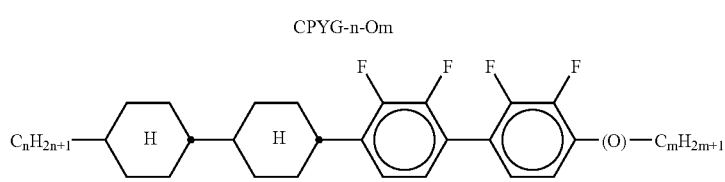
CCYY-n-(O)m -continued
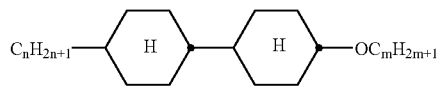
CCH-nOm
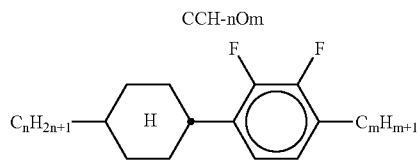
CY-n-m
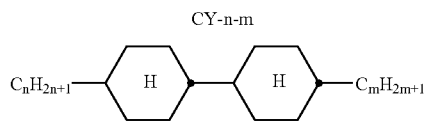
CCH-nm
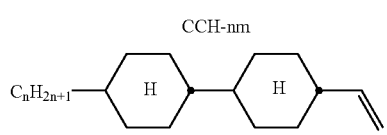
CC-n-V
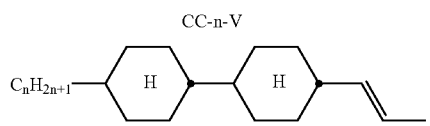
CC-n-V1
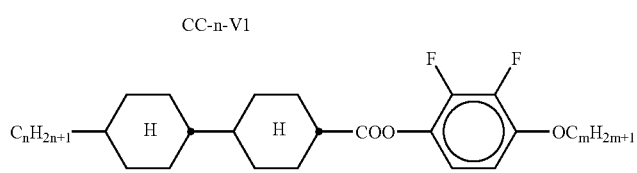
CP-nOmFF
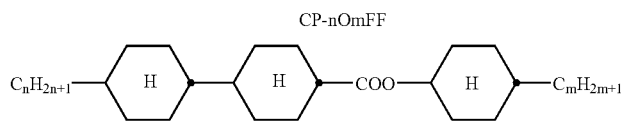
CH-nm
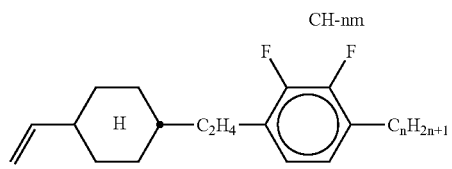
CEY-V-n
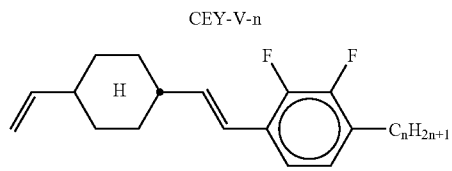
CVY-V-n
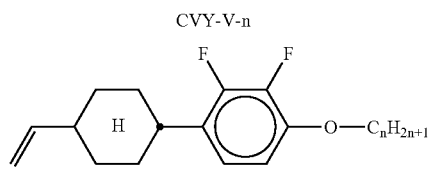
CY-V-On -continued
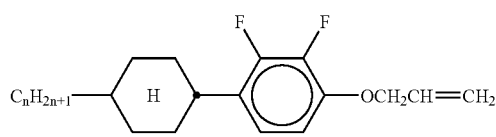
CY-n-O1V
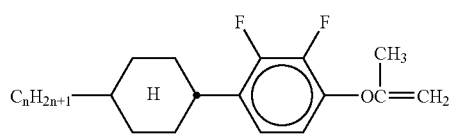
CY-n-OC(CH₃)=CH₂
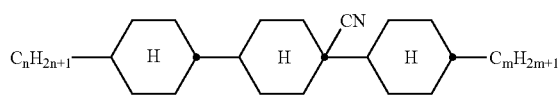
BCN-nm
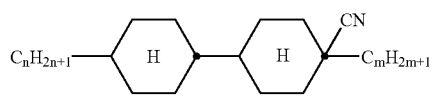
CCN-nm
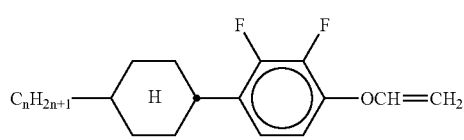
CY-n-OV
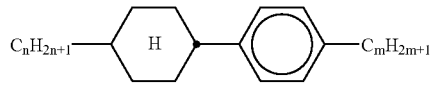
PCH-nm
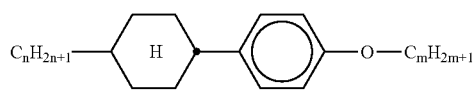
PCH-nOm
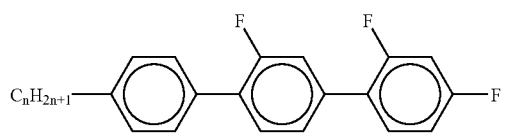
PGIGI-n-F
BCH-nm
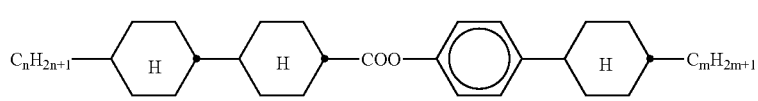
CCPC-nm -continued
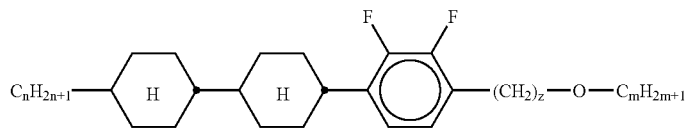
CCY-n-zOm
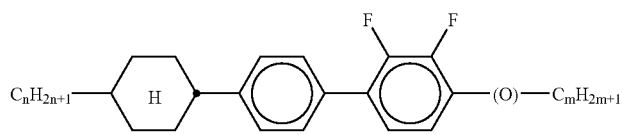
CPY-n-(O)m
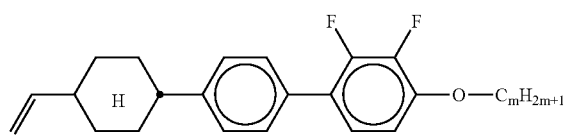
CPY-V-Om
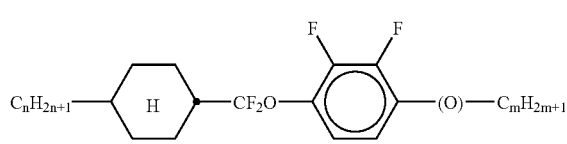
CQY-n-(O)m
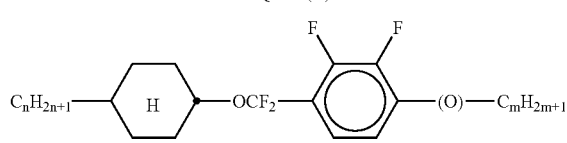
CQIY-n-(O)m
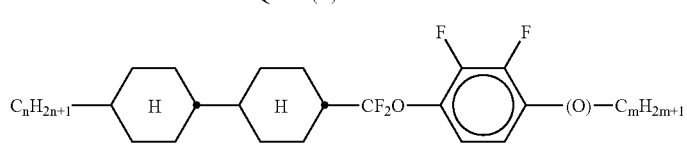
CCQY-n-(O)m
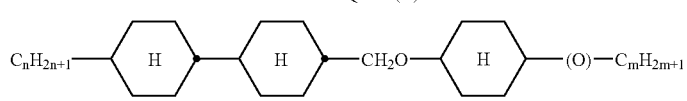
CCOC-n-m
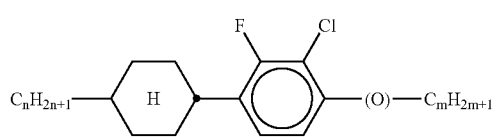
CP(F, Cl)-n-(O)m
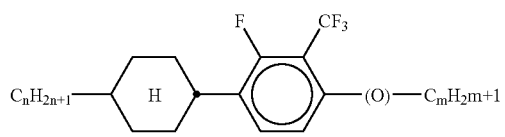
CP(F, CF$_3$)-n-(O)m -continued

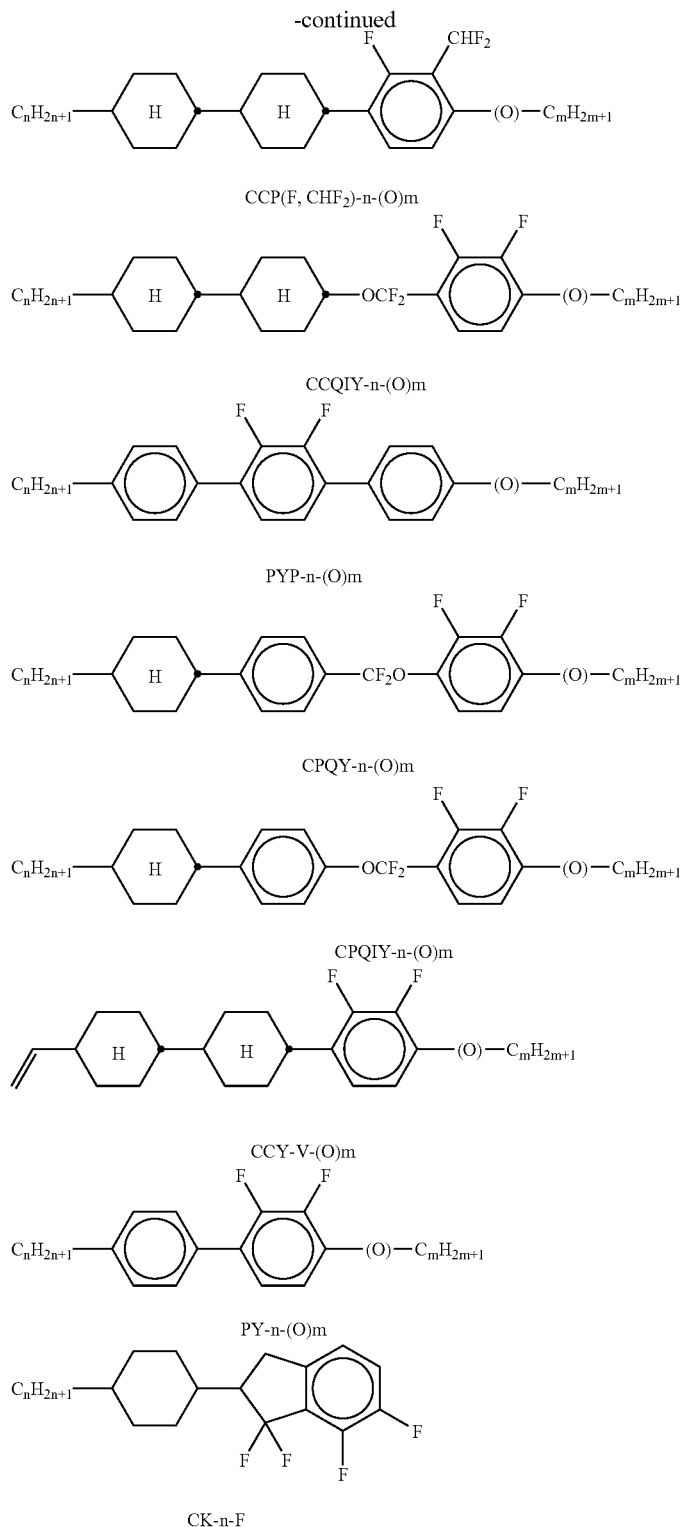

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV absorbers, antioxidants and freeradical scavengers. For example, 0-15% of pleochroic dyes, stabilisers or chiral dopants may be added.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)) in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows possible dopants which can be added to the mixtures according to the invention. If the mixtures comprise a dopant, it is employed in amounts of 0.01-4% by weight, preferably 0.1-1.0% by weight.

TABLE A

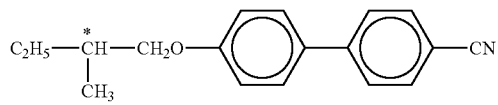

C 15

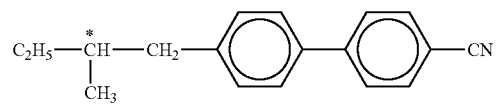

CB 15

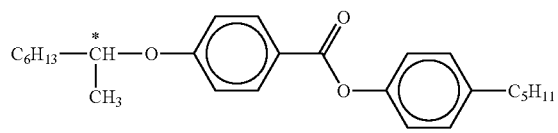

CM 21

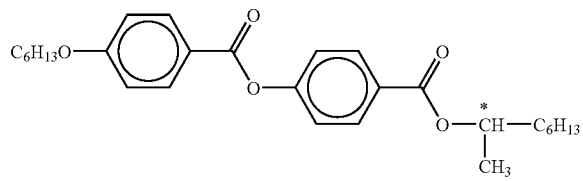

R/S-811

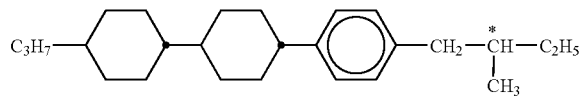

CM 44

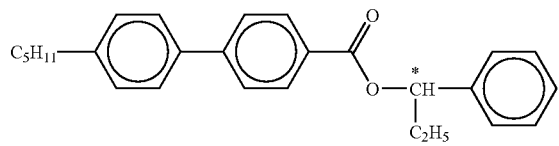

CM 45

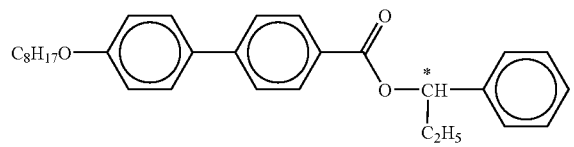

CM 47

TABLE A-continued
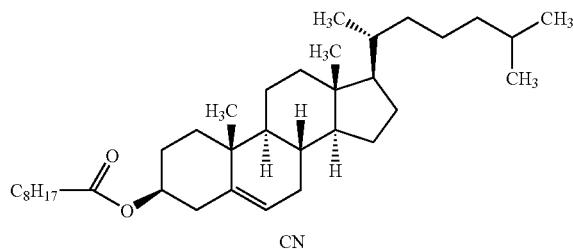
CN
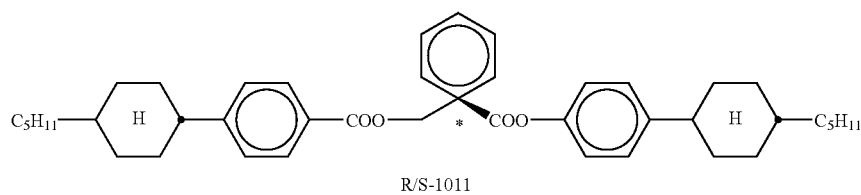
R/S-1011
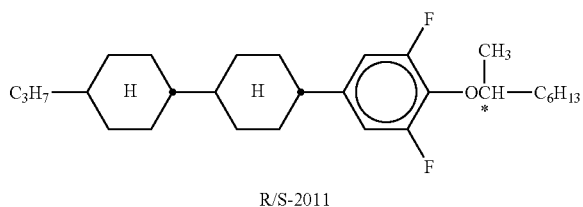
R/S-2011
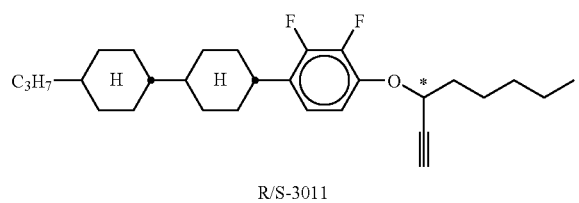
R/S-3011
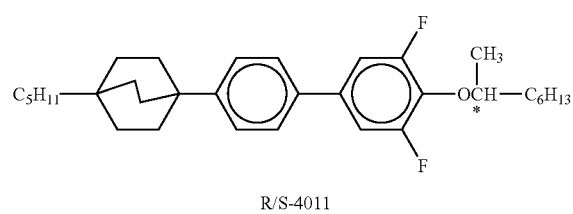
R/S-4011
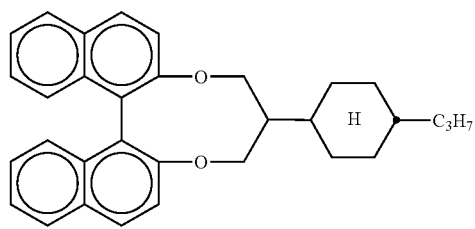
R/S-5011
Stabilisers which can be added, for example, to the mixtures according to the invention are shown below in Table B.

TABLE B
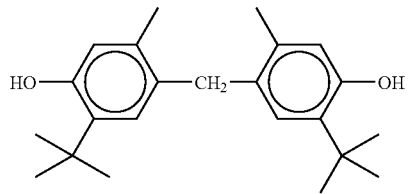
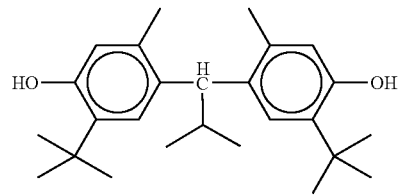
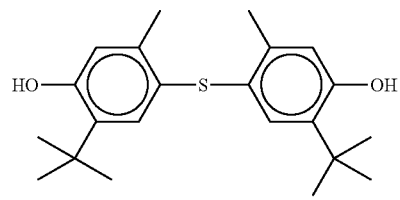
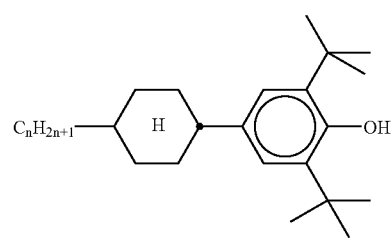
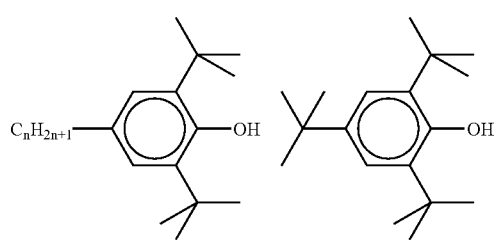
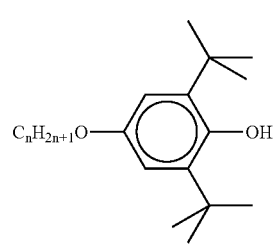
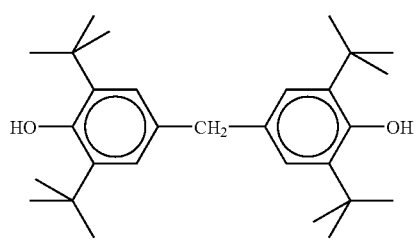

TABLE B-continued
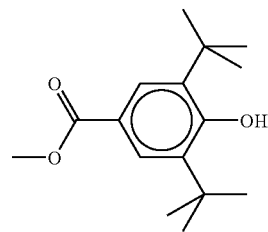
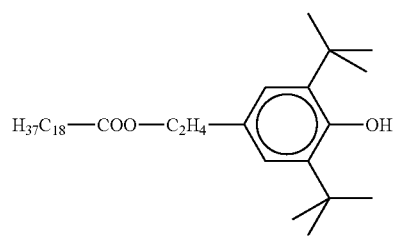
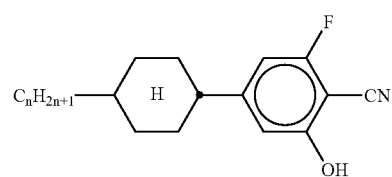
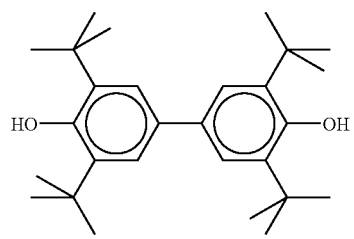
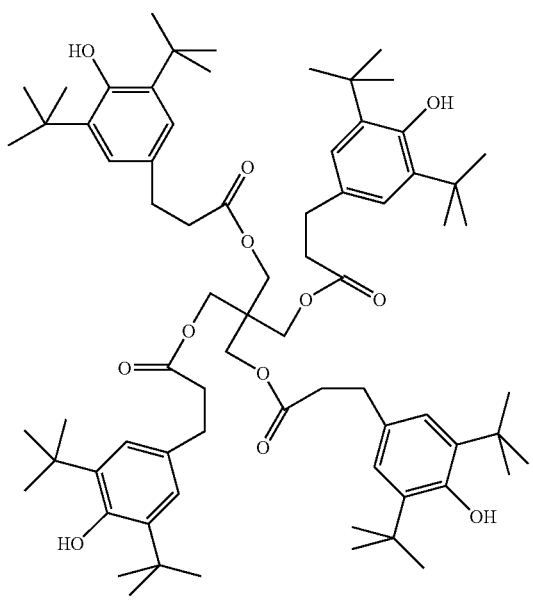

TABLE B-continued
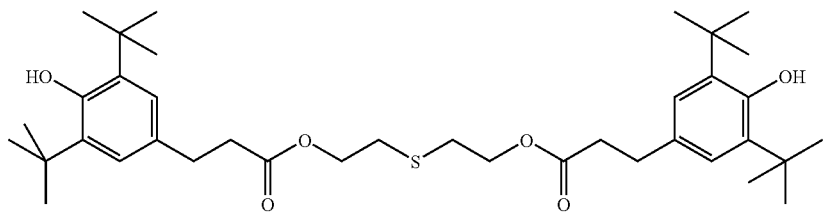
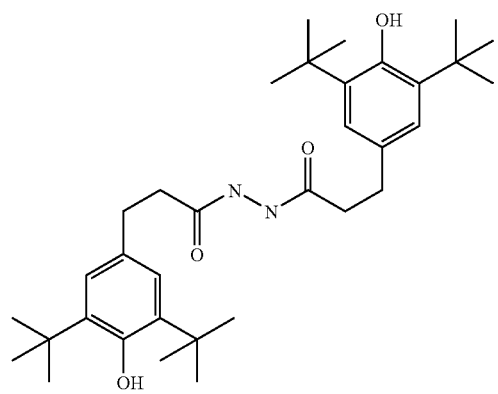
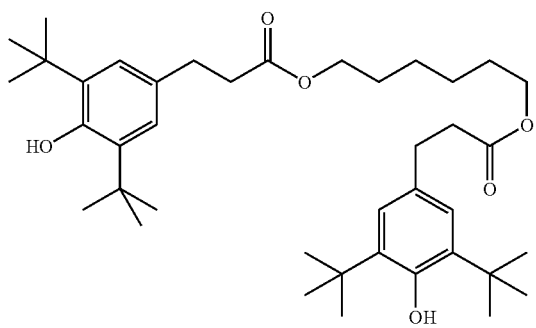
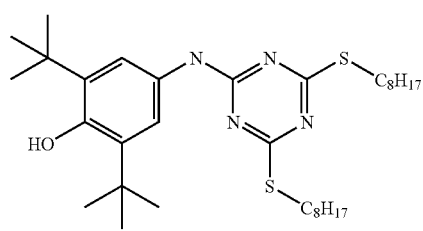

TABLE B-continued
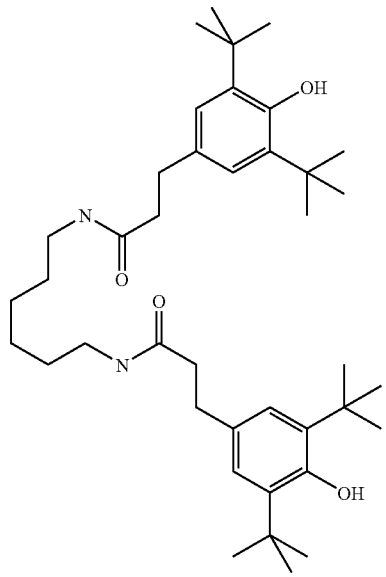
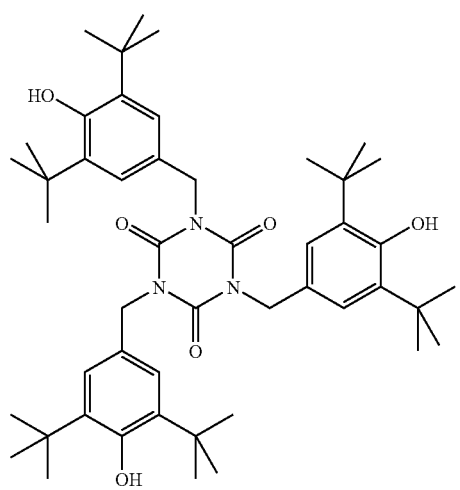
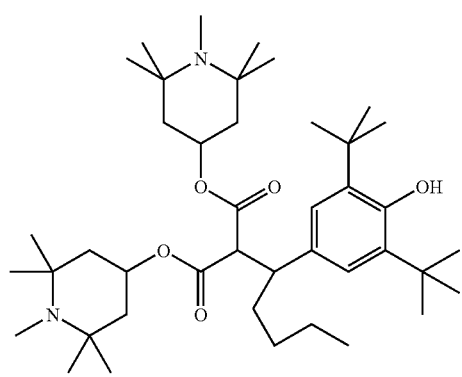

TABLE B-continued
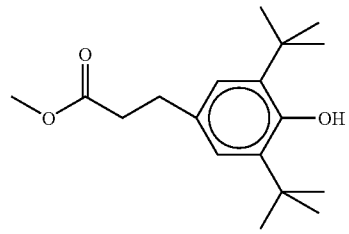
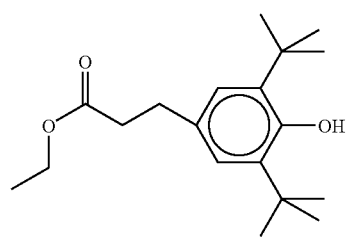
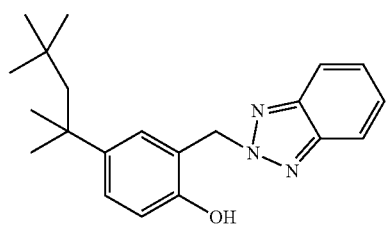
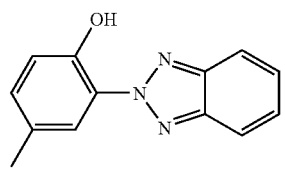
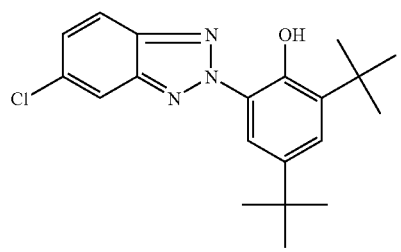
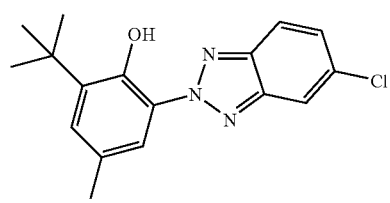

TABLE B-continued
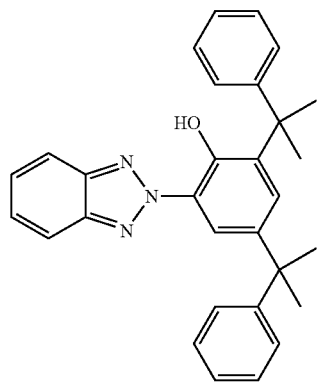
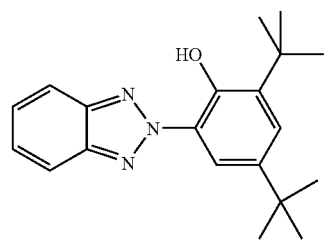
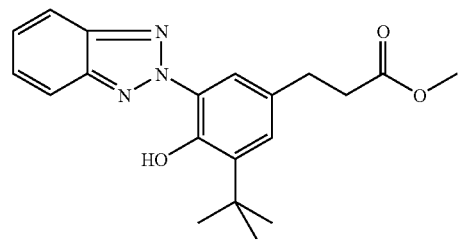
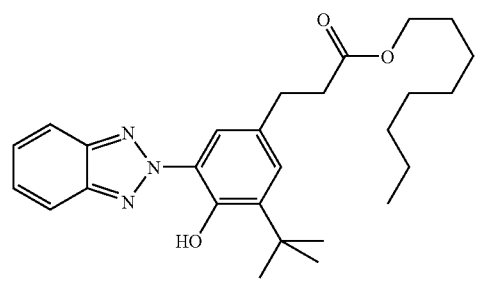

TABLE B-continued
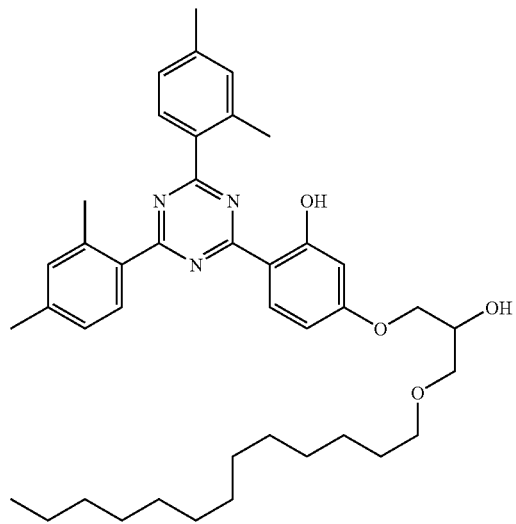
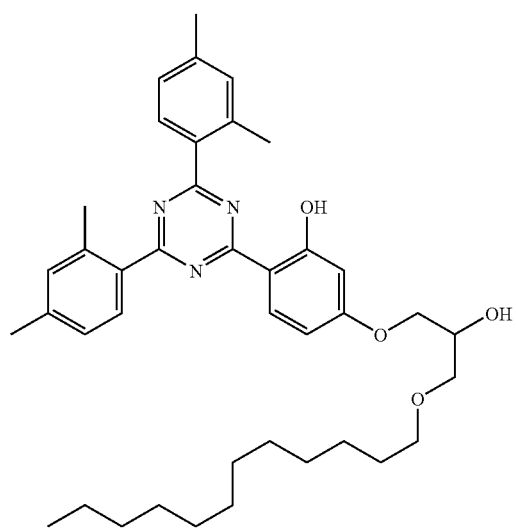
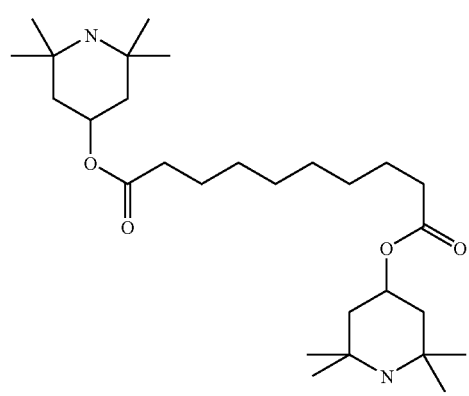

TABLE B-continued

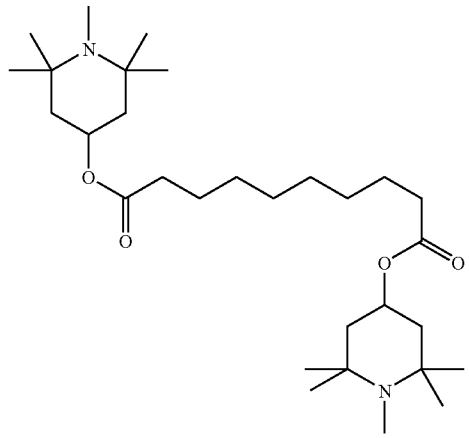

(n = 1–12)

The following examples are intended to explain the invention without limiting it. Above and below, $V_o$ denotes the threshold voltage, capacitive [V] at 20° C.
$\Delta n$ denotes the optical anisotropy measured at 20° C. and 589 nm
$\Delta \varepsilon$ denotes the dielectric anisotropy at 20° C. and 1 kHz
cp. denotes the clearing point [° C.]
$\gamma_1$ denotes the rotational viscosity measured at 20° C. [mPa·s]
LTS denotes the low temperature stability (nematic phase), determined in test cells The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

MIXTURE EXAMPLES

Example 1

| | | | |
|---|---|---|---|
| CY-3-O4 | 10.00% | Clearing point [° C.]: | 94.5 |
| CY-5-O2 | 7.00% | $\Delta n$ [589 nm, 20° C.]: | 0.1266 |
| CCY-4-O2 | 6.00% | $\varepsilon_{\parallel}$ [1 kHz, 20° C.]: | 3.6 |
| CCY-3-O3 | 11.00% | $\Delta \varepsilon$ [1 kHz, 20° C.]: | −3.6 |
| CPY-2-O2 | 9.00% | $K_1$ [pN, 20° C.]: | 15.6 |
| CPY-3-O2 | 9.00% | $K_3$ [pN, 20° C.]: | 15.1 |
| PYP-2-3 | 8.00% | $V_0$ [V, 20° C.]: | 2.18 |
| PYP-2-4 | 10.00% | $\gamma_1$ [mPa·s, 20° C.]: | 176 |
| CC-4-V | 14.00% | LTS cell [−40° C.]: | >1000 h |
| CC-3-V1 | 7.00% | | |
| CCH-34 | 5.00% | | |
| CPYP-3-2 | 4.00% | | |

Example 2

| | | | |
|---|---|---|---|
| CY-3-O4 | 10.00% | Clearing point [° C.]: | 95 |
| CY-5-O2 | 5.00% | $\Delta n$ [589 nm, 20° C.]: | 0.1269 |
| CCY-4-O2 | 7.00% | $\varepsilon_{\parallel}$ [1 kHz, 20° C.]: | 3.5 |
| CCY-3-O3 | 10.00% | $\Delta \varepsilon$ [1 kHz, 20° C.]: | −3.5 |
| CPY-2-O2 | 10.00% | $K_1$ [pN, 20° C.]: | 15.5 |
| CPY-3-O2 | 9.00% | $K_3$ [pN, 20° C.]: | 14.6 |
| PYP-2-3 | 8.00% | $V_0$ [V, 20° C.]: | 2.17 |
| PYP-2-4 | 10.00% | $\gamma_1$ [mPa·s, 20° C.]: | 170 |
| CC-4-V | 16.00% | LTS cell [−40° C.]: | >1000 h |
| CC-3-V1 | 6.00% | | |
| CCH-34 | 5.00% | | |
| CPYP-2-2 | 4.00% | | |

Example 3

| | | | |
|---|---|---|---|
| CY-3-O4 | 10.00% | Clearing point [° C.]: | 95.5 |
| CY-5-O2 | 7.00% | $\Delta n$ [589 nm, 20° C.]: | 0.1280 |
| CCY-4-O2 | 6.00% | $\varepsilon_{\parallel}$ [1 kHz, 20° C.]: | 3.6 |
| CCY-3-O3 | 10.00% | $\Delta \varepsilon$ [1 kHz, 20° C.]: | −3.3 |
| CPY-2-O2 | 9.00% | $K_1$ [pN, 20° C.]: | 12.5 |
| CPY-3-O2 | 10.00% | $K_3$ [pN, 20° C.]: | 14.4 |
| PYP-2-3 | 8.00% | $V_0$ [V, 20° C.]: | 2.21 |
| PYP-2-4 | 10.00% | $\gamma_1$ [mPa·s, 20° C.]: | 179 |
| CC-4-V | 14.00% | LTS cell [−40° C.]: | >1000 h |
| CC-3-V1 | 7.00% | | |
| CCH-34 | 5.00% | | |
| CPYP-3-3 | 4.00% | | |

Example 4

| | | | |
|---|---|---|---|
| CY-3-O4 | 10.00% | Clearing point [° C.]: | 95.5 |
| CY-5-O2 | 7.00% | $\Delta n$ [589 nm, 20° C.]: | 0.1277 |
| CCY-4-O2 | 6.00% | $\varepsilon_{\parallel}$ [1 kHz, 20° C.]: | 3.6 |
| CCY-3-O3 | 11.00% | $\Delta \varepsilon$ [1 kHz, 20° C.]: | −3.6 |
| CPY-2-O2 | 9.00% | $K_1$ [pN, 20° C.]: | 15.6 |
| CPY-3-O2 | 9.00% | $K_3$ [pN, 20° C.]: | 15.3 |
| PYP-2-3 | 9.00% | $V_0$ [V, 20° C.]: | 2.18 |
| PYP-2-4 | 9.00% | $\gamma_1$ [mPa·s, 20° C.]: | 177 |
| CC-4-V | 14.00% | LTS cell [−40° C.]: | >1000 h |
| CC-3-V1 | 7.00% | | |
| CCH-34 | 5.00% | | |
| CPYP-3-2V | 4.00% | | |

Example 5

| | | | |
|---|---|---|---|
| CY-3-O4 | 8.00% | Clearing point [° C.]: | 96 |
| CY-5-O2 | 7.00% | Δn [589 nm, 20° C.]: | 0.1276 |
| CCY-4-O2 | 6.00% | $\epsilon_{\parallel}$ [1 kHz, 20° C.]: | 3.5 |
| CCY-3-O3 | 10.00% | Δε [1 kHz, 20° C.]: | −3.5 |
| CPY-2-O2 | 10.00% | $K_1$ [pN, 20° C.]: | 15.7 |
| CPY-3-O2 | 9.00% | $K_3$ [pN, 20° C.]: | 14.8 |
| PYP-2-3 | 8.00% | $V_0$ [V, 20° C.]: | 2.17 |
| PYP-2-4 | 10.00% | $\gamma_1$ [mPa·s, 20° C.]: | 171 |
| CC-4-V | 15.00% | LTS cell [−40° C.]: | >1000 h |
| CC-3-V1 | 8.00% | | |
| CCH-34 | 5.00% | | |
| CPYG-2-O2 | 4.00% | | |

Example 6

| | | | |
|---|---|---|---|
| CY-3-O4 | 10.00% | Clearing point [° C.]: | 95.5 |
| CY-5-O2 | 6.00% | Δn [589 nm, 20° C.]: | 0.1281 |
| CCY-4-O2 | 9.00% | $\gamma_1$ [mPa·s, 20° C.]: | 176 |
| CCY-3-O3 | 10.00% | LTS cell [−40° C.]: | >1000 h |
| CPY-2-O2 | 9.00% | | |
| CPY-3-O2 | 8.00% | | |
| PYP-2-3 | 8.00% | | |
| PYP-2-4 | 9.00% | | |
| CC-4-V | 14.00% | | |
| CC-3-V1 | 8.00% | | |
| CCH-34 | 5.00% | | |
| PYGP-3-5 | 4.00% | | |

Example 7

| | | | |
|---|---|---|---|
| CY-5-O2 | 6.00% | Clearing point [° C.]: | 95 |
| CCY-3-O2 | 7.00% | Δn [589 nm, 20° C.]: | 0.1280 |
| CPY-2-O2 | 10.00% | $\epsilon_{\parallel}$ [1 kHz, 20° C.]: | 3.9 |
| CPY-3-O2 | 10.00% | Δε [1 kHz, 20° C.]: | −3.7 |
| PYP-2-3 | 9.00% | $K_1$ [pN, 20° C.]: | 16.1 |
| PYP-2-4 | 9.00% | $K_3$ [pN, 20° C.]: | 15.4 |
| CC-4-V | 18.00% | $V_0$ [V, 20° C.]: | 2.16 |
| CC-3-V1 | 7.00% | $\gamma_1$ [mPa·s, 20° C.]: | 154 |
| CCH-34 | 5.00% | LTS cell [−40° C.]: | >1000 h |
| CPYP-3-2 | 5.00% | | |
| CK-3-F | 7.00% | | |
| CK-5-F | 7.00% | | |

Example 8

| | | | |
|---|---|---|---|
| CY-3-O2 | 4.00% | Clearing point [° C.]: | 95 |
| CCY-3-O3 | 7.00% | Δn [589 nm, 20° C.]: | 0.1276 |
| CPY-2-O2 | 10.00% | $\epsilon_{\parallel}$ [1 kHz, 20° C.]: | 3.9 |
| CPY-3-O2 | 11.00% | Δε [1 kHz, 20° C.]: | −3.7 |
| PYP-2-3 | 7.00% | $K_1$ [pN, 20° C.]: | 15.6 |
| PYP-2-4 | 11.00% | $K_3$ [pN, 20° C.]: | 14.6 |
| CC-4-V | 18.00% | $V_0$ [V, 20° C.]: | 2.10 |
| CC-3-V1 | 8.00% | $\gamma_1$ [mPa·s, 20° C.]: | 156 |
| CCH-34 | 5.00% | | |
| CPYG-2-O2 | 5.00% | | |
| CK-3-F | 7.00% | | |
| CK-5-F | 7.00% | | |

Example 9

| | | | |
|---|---|---|---|
| CY-5-O2 | 7.00% | Clearing point [° C.]: | 95 |
| CPY-2-O2 | 11.00% | Δn [589 nm, 20° C.]: | 0.1268 |
| CPY-3-O2 | 10.00% | $\epsilon_{\parallel}$ [1 kHz, 20° C.]: | 4.0 |
| PYP-2-3 | 6.00% | Δε [1 kHz, 20° C.]: | −3.7 |
| PYP-2-4 | 7.00% | $K_1$ [pN, 20° C.]: | 15.5 |
| CC-4-V | 17.00% | $K_3$ [pN, 20° C.]: | 15.2 |
| CC-3-V1 | 9.00% | $V_0$ [V, 20° C.]: | 2.15 |
| CCH-34 | 5.00% | $\gamma_1$ [mPa·s, 20° C.]: | 155 |
| CPYP-3-2 | 5.00% | LTS cell [−30° C.]: | >1000 h |
| CPYP-2-1 | 5.00% | | |
| CK-3-F | 9.00% | | |
| CK-5-F | 9.00% | | |

Example 10

| | | | |
|---|---|---|---|
| CY-3-O4 | 7.00% | Clearing point [° C.]: | 99 |
| CY-5-O2 | 10.00% | Δn [589 nm, 20° C.]: | 0.0925 |
| CY-5-O4 | 6.00% | $\epsilon_{\parallel}$ [1 kHz, 20° C.]: | 3.5 |
| CCY-3-O2 | 9.00% | Δε [1 kHz, 20° C.]: | −3.9 |
| CCY-5-O2 | 5.00% | $K_1$ [pN, 20° C.]: | 16.9 |
| CCY-3-O3 | 12.00% | $K_3$ [pN, 20° C.]: | 17.9 |
| CCY-2-1 | 10.00% | $V_0$ [V, 20° C.]: | 2.26 |
| CCY-3-1 | 10.00% | LTS cell [−40° C.]: | >1000 h |
| CCY-5-1 | 5.00% | | |
| CC-5-V | 18.00% | | |
| CC-3-V1 | 3.00% | | |
| CPYP-3-2 | 5.00% | | |

Example 11

| | | | |
|---|---|---|---|
| CY-3-O4 | 7.00% | Clearing point [° C.]: | 99.5 |
| CY-5-O2 | 10.00% | Δn [589 nm, 20° C.]: | 0.0838 |
| CY-5-O4 | 6.00% | $\epsilon_{\parallel}$ [1 kHz, 20° C.]: | 3.5 |
| CCY-3-O2 | 9.00% | Δε [1 kHz, 20° C.]: | −3.9 |
| CCY-5-O2 | 5.00% | $K_1$ [pN, 20° C.]: | 16.8 |
| CCY-3-O3 | 12.00% | $K_3$ [pN, 20° C.]: | 18.3 |
| CCY-2-1 | 10.00% | $V_0$ [V, 20° C.]: | 2.29 |
| CCY-3-1 | 10.00% | LTS cell [−40° C.]: | >1000 h |
| CCY-5-1 | 5.00% | | |
| CC-5-V | 18.00% | | |
| CC-3-V1 | 3.00% | | |
| CPYP-3-2V | 5.00% | | |

Example 12

| | | | |
|---|---|---|---|
| CY-3-O4 | 16.00% | Clearing point [° C.]: | 97 |
| CY-5-O2 | 9.00% | Δn [589 nm, 20° C.]: | 0.1280 |
| CCY-4-O2 | 8.00% | $\epsilon_{\parallel}$ [1 kHz, 20° C.]: | 4.0 |
| CCY-3-O3 | 11.00% | Δε [1 kHz, 20° C.]: | −5.1 |
| CPY-2-O2 | 12.00% | $K_1$ [pN, 20° C.]: | 14.5 |
| CPY-3-O2 | 12.00% | $K_3$ [pN, 20° C.]: | 15.3 |
| PYP-2-3 | 5.00% | $V_0$ [V, 20° C.]: | 1.84 |
| PYP-2-4 | 4.00% | $\gamma_1$ [mPa·s, 20° C.]: | 251 |
| CC-4-V | 16.00% | LTS cell [−40° C.]: | >1000 h |
| CPYG-2-O2 | 7.00% | | |

Example 13

| | | | |
|---|---|---|---|
| CY-3-O4 | 18.00% | Clearing point [° C.]: | 96 |
| CY-5-O2 | 10.00% | Δn [589 nm, 20° C.]: | 0.1275 |
| CCY-4-O2 | 10.00% | $\epsilon_{\|\|}$ [1 kHz, 20° C.]: | 4.0 |
| CCY-3-O3 | 10.00% | Δε [1 kHz, 20° C.]: | −5.1 |
| CPY-2-O2 | 11.00% | $K_1$ [pN, 20° C.]: | 14.4 |
| CPY-3-O2 | 12.00% | $K_3$ [pN, 20° C.]: | 15.6 |
| PYP-2-3 | 5.00% | $V_0$ [V, 20° C.]: | 1.84 |
| PYP-2-4 | 4.00% | $\gamma_1$ [mPa · s, 20° C.]: | 253 |
| CC-4-V | 13.00% | LTS cell [−40° C.]: | >1000 h |
| CPYP-3-2 | 7.00% | | |

Example 14

| | | | |
|---|---|---|---|
| CY-3-O4 | 20.00% | Clearing point [° C.]: | 96.5 |
| CY-5-O2 | 12.00% | Δn [589 nm, 20° C.]: | 0.1303 |
| CY-5-O4 | 7.00% | $\epsilon_{\|\|}$ [1 kHz, 20° C.]: | 4.4 |
| CCY-4-O2 | 12.00% | Δε [1 kHz, 20° C.]: | −7.1 |
| CCY-3-O3 | 12.00% | $K_1$ [pN, 20° C.]: | 14.6 |
| CCY-3-O2 | 2.00% | $K_3$ [pN, 20° C.]: | 16.9 |
| CPY-2-O2 | 11.00% | $V_0$ [V, 20° C.]: | 1.63 |
| CPY-3-O2 | 12.00% | LTS cell [−40° C.]: | >1000 h |
| PYP-2-3 | 6.00% | | |
| CPYG-2-O2 | 6.00% | | |

Example 15

| | | | |
|---|---|---|---|
| CY-3-O4 | 20.00% | Clearing point [° C.]: | 97.5 |
| CY-5-O2 | 10.00% | Δn [589 nm, 20° C.]: | 0.1239 |
| CY-5-O4 | 10.00% | $\epsilon_{\|\|}$ [1 kHz, 20° C.]: | 4.3 |
| CCY-4-O2 | 12.00% | Δε [1 kHz, 20° C.]: | −7.1 |
| CCY-3-O3 | 12.00% | $K_1$ [pN, 20° C.]: | 14.7 |
| CCY-3-O2 | 4.00% | $K_3$ [pN, 20° C.]: | 17.1 |
| CPY-2-O2 | 12.00% | $V_0$ [V, 20° C.]: | 1.64 |
| CPY-3-O2 | 12.00% | | |
| PYP-2-3 | 2.00% | | |
| CPYP-3-2 | 6.00% | | |

Example 16

| | | | |
|---|---|---|---|
| CY-3-O2 | 3.00% | Clearing point [° C.]: | 104 |
| CCY-3-O3 | 7.00% | Δn [589 nm, 20° C.]: | 0.1302 |
| CCY-4-O2 | 3.00% | $\epsilon_{\|\|}$ [1 kHz, 20° C.]: | 3.9 |
| CPY-2-O2 | 10.00% | Δε [1 kHz, 20° C.]: | −3.4 |
| CPY-3-O2 | 10.00% | $K_1$ [pN, 20° C.]: | 13.8 |
| PYP-2-3 | 8.00% | $K_3$ [pN, 20° C.]: | 15.3 |
| PYP-2-4 | 9.00% | $V_0$ [V, 20° C.]: | 2.24 |
| CC-4-V | 14.00% | $\gamma_1$ [mPa · s, 20° C.]: | 175 |
| CC-3-V1 | 7.00% | LTS cell [−40° C.]: | >1000 h |
| CCH-34 | 5.00% | | |
| CCP-V-1 | 5.00% | | |
| CPYP-3-2 | 5.00% | | |
| CK-3-F | 7.00% | | |
| CK-5-F | 7.00% | | |

Example 17

| | | | |
|---|---|---|---|
| CY-3-O2 | 2.00% | Clearing point [° C.]: | 104.5 |
| CCY-3-O3 | 7.00% | Δn [589 nm, 20° C.]: | 0.1306 |
| CCY-4-O2 | 3.00% | $\epsilon_{\|\|}$ [1 kHz, 20° C.]: | 3.9 |
| CPY-2-O2 | 10.00% | Δε [1 kHz, 20° C.]: | −3.7 |
| CPY-3-O2 | 10.00% | $K_1$ [pN, 20° C.]: | 17.1 |
| PYP-2-3 | 8.00% | $K_3$ [pN, 20° C.]: | 16.0 |
| PYP-2-4 | 9.00% | $V_0$ [V, 20° C.]: | 2.19 |
| CC-4-V | 14.00% | $\gamma_1$ [mPa · s, 20° C.]: | 180 |
| CC-3-V1 | 8.00% | LTS cell [−30° C.]: | >1000 h |
| CCH-34 | 5.00% | | |
| CCP-V-1 | 5.00% | | |
| CPYG-2-O2 | 5.00% | | |
| CK-3-F | 7.00% | | |
| CK-5-F | 7.00% | | |

Example 18

| | | | |
|---|---|---|---|
| CY-5-O2 | 8.00% | Clearing point [° C.]: | 101 |
| CY-3-O4 | 14.00% | Δn [589 nm, 20° C.]: | 0.1601 |
| CCY-3-O3 | 7.00% | $\epsilon_{\|\|}$ [1 kHz, 20° C.]: | 3.8 |
| CPY-2-O2 | 12.00% | Δε [1 kHz, 20° C.]: | −4.1 |
| CPY-3-O2 | 12.00% | $K_1$ [pN, 20° C.]: | 16.3 |
| BCH-32 | 7.00% | $K_3$ [pN, 20° C.]: | 16.6 |
| CC-5-V | 9.00% | $V_0$ [V, 20° C.]: | 2.13 |
| PYP-2-4 | 14.00% | $\gamma_1$ [mPa · s, 20° C.]: | 283 |
| PYP-2-3 | 12.00% | LTS cell [−40° C.]: | >1000 h |
| CPYP-3-2 | 5.00% | | |

Example 19

| | | | |
|---|---|---|---|
| CY-5-O2 | 12.00% | Clearing point [° C.]: | 100 |
| CY-3-O4 | 8.00% | Δn [589 nm, 20° C.]: | 0.1293 |
| CCY-3-O3 | 11.00% | $\epsilon_{\|\|}$ [1 kHz, 20° C.]: | 3.7 |
| CCY-4-O2 | 5.00% | Δε [1 kHz, 20° C.]: | −4.1 |
| CPY-2-O2 | 12.00% | $K_1$ [pN, 20° C.]: | 16.8 |
| CPY-3-O2 | 12.00% | $K_3$ [pN, 20° C.]: | 16.8 |
| CC-5-V | 12.00% | $V_0$ [V, 20° C.]: | 2.13 |
| CC-3-V1 | 10.00% | $\gamma_1$ [mPa · s, 20° C.]: | 216 |
| PYP-2-4 | 13.00% | LTS cell [−30° C.]: | >1000 h |
| CPYP-3-2 | 5.00% | | |

Example 20

| | | | |
|---|---|---|---|
| CCY-3-O3 | 12.00% | Clearing point [° C.]: | 85 |
| CCY-4-O2 | 10.00% | Δn [589 nm, 20° C.]: | 0.1589 |
| CC-5-V | 11.00% | $\epsilon_{\|\|}$ [1 kHz, 20° C.]: | 3.9 |
| PYP-2-3 | 10.00% | Δε [1 kHz, 20° C.]: | −4.2 |
| PYP-2-4 | 14.00% | $K_1$ [pN, 20° C.]: | 16.0 |
| PY-3-O4 | 17.00% | $K_3$ [pN, 20° C.]: | 14.2 |
| PY-5-O4 | 16.00% | $V_0$ [V, 20° C.]: | 1.95 |
| CPYP-3-2 | 10.00% | $\gamma_1$ [mPa · s, 20° C.]: | 237 |
| | | LTS cell [−40° C.]: | >1000 h |

Example 21

| | | | |
|---|---|---|---|
| CY-5-O2 | 11.00% | Clearing point [° C.]: | 94.5 |
| CCY-3-O2 | 9.00% | Δn [589 nm, 20° C.]: | 0.1277 |
| CPY-2-O2 | 8.00% | ε∥ [1 kHz, 20° C.]: | 4.0 |
| CPY-3-O2 | 8.00% | Δε [1 kHz, 20° C.]: | −4.0 |
| PYP-2-3 | 9.00% | K₁ [pN, 20° C.]: | 16.6 |
| PYP-2-4 | 9.00% | K₃ [pN, 20° C.]: | 16.2 |
| CC-5-V | 14.00% | V₀ [V, 20° C.]: | 2.12 |
| CC-3-V1 | 8.00% | γ₁ [mPa · s, 20° C.]: | 172 |
| CCH-34 | 5.00% | LTS cell [−40° C.]: | >1000 h |
| CPYP-3-2 | 5.00% | | |
| CK-3-F | 7.00% | | |
| CK-5-F | 7.00% | | |

Example 22

| | | | |
|---|---|---|---|
| CY-3-O2 | 3.00% | Clearing point [° C.]: | 104 |
| CCY-3-O3 | 7.00% | Δn [589 nm, 20° C.]: | 0.1302 |
| CCY-4-O2 | 3.00% | ε∥ [1 kHz, 20° C.]: | 3.9 |
| CPY-2-O2 | 10.00% | Δε [1 kHz, 20° C.]: | −3.4 |
| CPY-3-O2 | 10.00% | K₁ [pN, 20° C.]: | 13.8 |
| PYP-2-3 | 8.00% | K₃ [pN, 20° C.]: | 15.3 |
| PYP-2-4 | 9.00% | V₀ [V, 20° C.]: | 2.24 |
| CC-4-V | 14.00% | γ₁ [mPa · s, 20° C.]: | 175 |
| CC-3-V1 | 7.00% | LTS cell [−40° C.]: | >1000 h |
| CCH-34 | 5.00% | | |
| CCP-V-1 | 5.00% | | |
| CPYP-3-2 | 5.00% | | |
| CK-3-F | 7.00% | | |
| CK-5-F | 7.00% | | |

Example 23

| | | | |
|---|---|---|---|
| CY-3-O4 | 20.00% | Clearing point [° C.]: | +85.0 |
| CY-5-O2 | 8.00% | Δn [589 nm, 20° C.]: | +0.1580 |
| CPY-2-O2 | 12.00% | ε∥ [1 kHz, 20° C.]: | 3.9 |
| CPY-3-O2 | 12.00% | Δε [1 kHz, 20° C.]: | −4.2 |
| CC-3-V1 | 12.00% | K₁ [pN, 20° C.]: | 15.5 |
| PYP-2-3 | 16.00% | K₃ [pN, 20° C.]: | 13.3 |
| PYP-2-4 | 16.00% | γ₁ [mPa · s, 20° C.]: | 234 |
| CPYP-3-2 | 4.00% | V₀ [V, 20° C.]: | 2.15 |

Example 24

| | | | |
|---|---|---|---|
| CY-3-O2 | 11.00% | Clearing point [° C.]: | +78.5 |
| CCY-3-O2 | 3.00% | Δn [589 nm, 20° C.]: | +0.0793 |
| CCY-3-O3 | 11.00% | ε∥ [1 kHz, 20° C.]: | 3.8 |
| CCY-4-O2 | 9.00% | Δε [1 kHz, 20° C.]: | −3.3 |
| CC-5-V | 20.00% | K₁ [pN, 20° C.]: | 14.0 |
| CC-3-V1 | 12.00% | K₃ [pN, 20° C.]: | 15.6 |
| CCOC-4-3 | 2.00% | γ₁ [mPa · s, 20° C.]: | 110 |
| PCH-302 | 9.00% | V₀ [V, 20° C.]: | 2.29 |
| CCH-303 | 5.00% | | |
| CPYP-3-2 | 3.00% | | |
| CK-4-F | 5.00% | | |
| CK-5-F | 5.00% | | |
| CK-3-F | 5.00% | | |

Example 25

| | | | |
|---|---|---|---|
| CY-3-O2 | 20.00% | Clearing point [° C.]: | +95.5 |
| CY-5-O2 | 5.00% | Δn [589 nm, 20° C.]: | +0.1011 |
| CCY-3-O2 | 12.00% | ε∥ [1 kHz, 20° C.]: | 4.7 |
| CCY-3-O3 | 12.00% | Δε [1 kHz, 20° C.]: | −7.4 |
| CCY-4-O2 | 12.00% | K₁ [pN, 20° C.]: | 13.5 |
| CCY-5-O2 | 3.00% | K₃ [pN, 20° C.]: | 17.2 |
| CPY-2-O2 | 8.00% | V₀ [V, 20° C.]: | 278 |
| CPYP-3-2 | 4.00% | γ₁ [mPa · s, 20° C.]: | 1.61 |
| CC-4-V | 9.00% | | |
| CK-5-F | 5.00% | | |
| CK-3-F | 5.00% | | |
| CK-4-F | 5.00% | | |

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German application No. 102005023556.5, filed May 21, 2005 are incorporated by reference herein.

The invention claimed is:

1. A liquid-crystalline medium based on a mixture of polar compounds, which comprises:

at least one compound of the formula I:

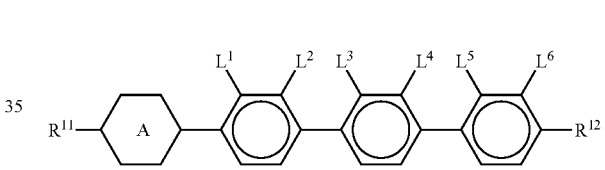

in which $R^{11}$ and $R^{12}$ each, independently of one another, are H, an alkyl or alkenyl radical having up to 15 C atoms which is unsubstituted, monosubstituted by CN or $CF_3$ or mono- to perhalo-substituted by halogen, where, optionally, one or more $CH_2$ groups in these radicals are replaced by —O—, —S—,

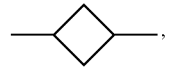

—C≡C—, —$CF_2$O—, —OC—O— or —O—CO— in such a way that O atoms are not linked directly to one another,

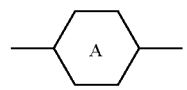

is a) a 1,4-cyclohexenylene or 1,4-cyclohexylene radical, in which one or two non-adjacent $CH_2$ groups are optionally replaced by —O— or —S—, b) a 1,4-phenylene radical, in which one or two CH groups are optionally replaced by N, c) a radical selected from the group consisting of piperi-dine-1,4-diyl, 1,4-bicyclo[2.2.2]octylene, naphthalene-2,6-diyl, decahydronaphthalene-2,6-diyl, 1,2,3,4-tet-rahydronaphthalene-2,6-diyl, phenanthrene-2,7-diyl and fluorene-2,7-diyl, where the radicals a), b) and c) are optionally monosubstituted or polysubstituted by halogen atoms, and $L^{1-6}$ each, independently of one another, are H or F, with the proviso that at least one pair of radicals $L^1$ and $L^2$ or $L^3$ and $L^4$ or $L^5$ and $L^6$ are both F;

and one or more compounds of the formulae IIA and/or IIB:

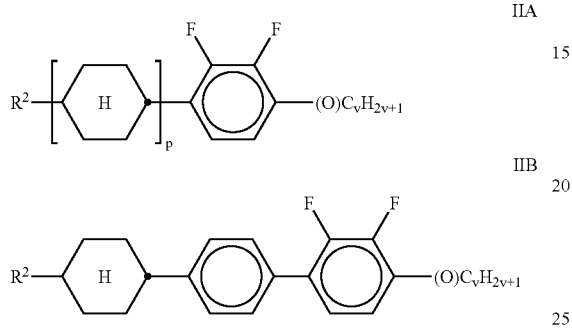

in which $R^2$ is an alkyl or alkenyl radical having up to 15 C atoms which is unsubstituted, monosubstituted by CN or $CF_3$ or mono- to perhalo-substituted by halogen, where, optionally, one or more $CH_2$ groups in these radicals are replaced, independently of one another, by —O—, —S—,

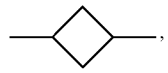

—C≡C—, —CO—, —CO—O—, —O—CO— or —O—CO—O— in such a way that O atoms are not linked directly to one another, p is 1 or 2, and v is 1 to 6.

2. The liquid-crystalline medium of claim 1, which additionally comprises one or more compounds of the formula III

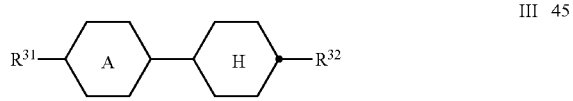

in which $R^{31}$ and $R^{32}$ each, independently of one another, are a straight-chain alkyl, alkenyl, alkoxyalkyl or alkoxy radical having up to 12 C atoms, and

denotes

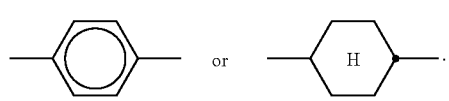

3. The liquid-crystalline medium of claim 1, which comprises one, two, three or four compounds of the formula I.

4. The liquid-crystalline medium of claim 1, wherein the proportion of compounds of the formula I in the mixture as a whole is at least 2% by weight.

5. The liquid-crystalline medium of claim 1, wherein the proportion of compounds of the formulae IIA and/or IIB in the mixture as a whole is at least 20% by weight.

6. The liquid-crystalline medium of claim 2, wherein the proportion of compounds of the formula III in the mixture as a whole is at least 3% by weight.

7. The liquid-crystalline medium of claim 1, which comprises at least one compound selected from the compounds of formulae I1 to I19:

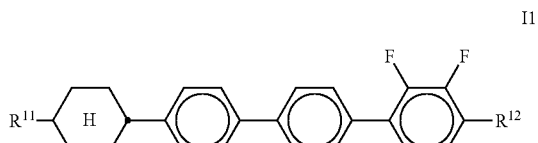

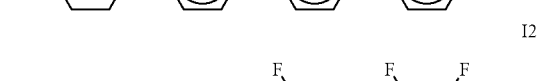

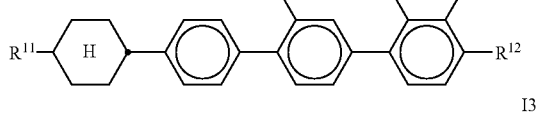

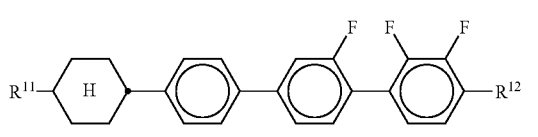

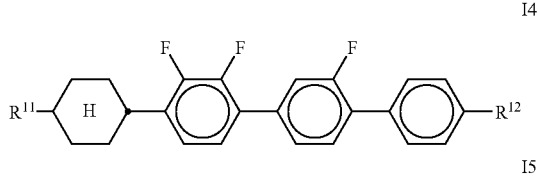

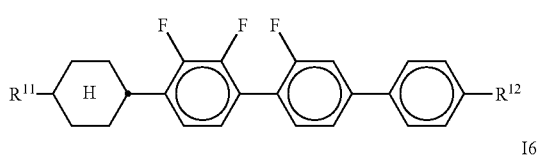

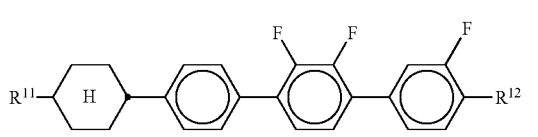

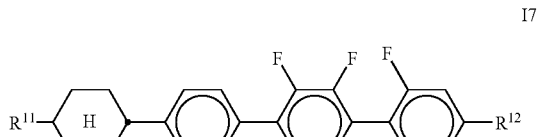

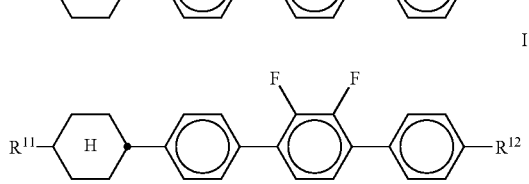

-continued

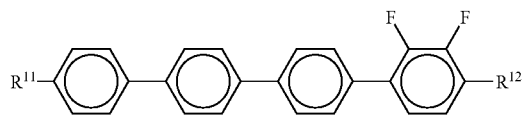
I9

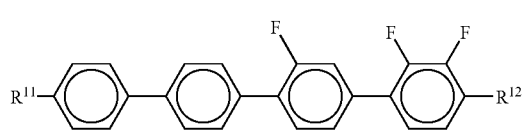
I10

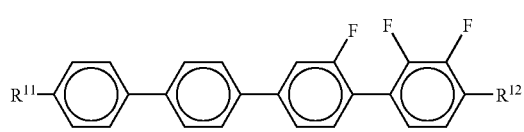
I11

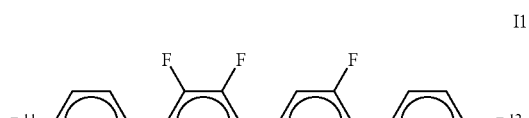
I12

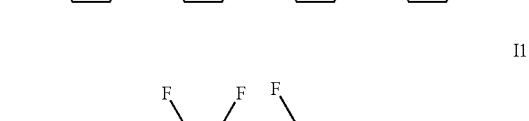
I13

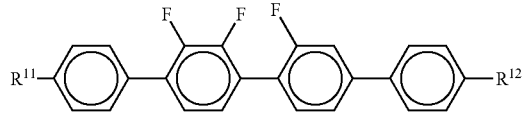
I14

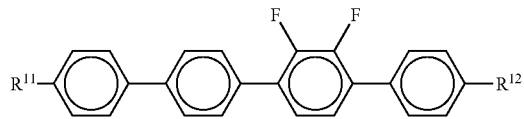
I15

-continued

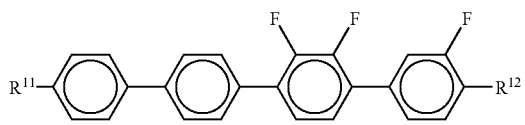
I16

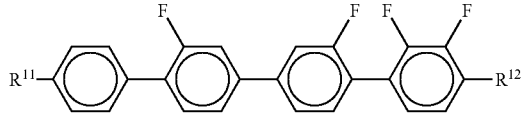
I17 in which

R$^{11}$ and R$^{12}$ have meanings indicated in claim 1.

8. The liquid-crystalline medium of claim 1, which comprises:

2-20% by weight of one or more compounds of the formula I and 20-80% by weight of one or more compounds of the formulae IIA and/or IIB.

9. An electro-optical display with active-matrix addressing based on the ECB, PALC, FFS or IPS effect, which comprises, as dielectric, a liquid-crystalline medium according to claim 1.

10. The liquid-crystalline medium of claim 1, wherein, in formula I, R$^{11}$ and R$^{12}$ are independently alkyl of 1 to 6 C atoms.

11. The liquid-crystalline medium of claim 1, wherein the medium has a nematic phase range of at least 60 K, a flow viscosity $V_{20}$ of at most 30 mm$^2 \cdot$s$^{-1}$ at 20° C., a dielectric anisotropy, $\Delta \in$, of about −0.5 to −8.0, and a rotational viscosity, $\gamma_1$, <200 mPa·s.

12. The liquid-crystalline medium of claim 1, wherein R$^{11}$ and R$^{12}$ in the compounds of the formula I are independently selected from H, alkyl, alkenyl or alkoxy having up to 6 C atoms.

13. The liquid-crystalline medium of claim 1, wherein R$^{11}$ and R$^{12}$ in the compounds of the formula I are independently selected from alkyl.

14. The liquid-crystalline medium of claim 1, wherein R$^{11}$ in the compounds of the formula I is straight-chain alkyl, vinyl, 1E-alkenyl or 3-alkenyl.

* * * * *